United States Patent
Ohata et al.

(10) Patent No.: US 9,150,760 B2
(45) Date of Patent: Oct. 6, 2015

(54) FLAME RETARDANT ADHESIVE SHEET

(75) Inventors: Kenji Ohata, Tokyo (JP); Youichi Inao, Tokyo (JP)

(73) Assignee: LINTEC CORPORATION, Tokyo (JP)

(*) Notice: Subject to any disclaimer, the term of this patent is extended or adjusted under 35 U.S.C. 154(b) by 0 days.

(21) Appl. No.: 14/129,716

(22) PCT Filed: Sep. 7, 2012

(86) PCT No.: PCT/JP2012/072978
§ 371 (c)(1),
(2), (4) Date: Dec. 27, 2013

(87) PCT Pub. No.: WO2013/042560
PCT Pub. Date: Mar. 28, 2013

(65) Prior Publication Data
US 2014/0134414 A1    May 15, 2014

(30) Foreign Application Priority Data

Sep. 22, 2011 (JP) ................................. 2011-207964

(51) Int. Cl.
| | |
|---|---|
| C09J 7/02 | (2006.01) |
| C09J 11/06 | (2006.01) |
| C09J 133/00 | (2006.01) |
| C09J 175/04 | (2006.01) |
| C08G 18/73 | (2006.01) |
| C08G 18/10 | (2006.01) |
| C08G 18/48 | (2006.01) |

(52) U.S. Cl.
CPC . *C09J 7/02* (2013.01); *C08G 18/10* (2013.01); *C08G 18/48* (2013.01); *C08G 18/4825* (2013.01); *C08G 18/73* (2013.01); *C09J 7/0264* (2013.01); *C09J 11/06* (2013.01); *C09J 133/00* (2013.01); *C09J 175/04* (2013.01); *C09J 2201/622* (2013.01); *C09J 2433/00* (2013.01); *C09J 2461/006* (2013.01); *C09J 2475/00* (2013.01); *C09J 2477/006* (2013.01); *C09J 2479/086* (2013.01); *C09J 2481/006* (2013.01); *Y10T 428/24975* (2015.01)

(58) Field of Classification Search
CPC ............ C09J 2201/622; C09J 2433/00; C09J 2475/00; C09J 175/04; C09J 11/06; C09J 133/00; C09J 7/02; C09J 7/0264; C09J 2461/006; C09J 2477/006; C09J 2479/086; C09J 2481/006; Y10T 428/24975; C08G 18/10; C08G 18/48; C08G 18/73
USPC .......... 428/343, 366, 216; 524/761, 762, 764; 528/78; 438/118
See application file for complete search history.

(56) References Cited

U.S. PATENT DOCUMENTS

| | | | | |
|---|---|---|---|---|
| 3,718,712 | A | * | 2/1973 | Tushaus .................. 525/458 |
| 4,543,405 | A | * | 9/1985 | Ambrose et al. ........... 528/78 |
| 5,608,000 | A | * | 3/1997 | Duan et al. ............... 524/591 |
| 2003/0212235 | A1 | * | 11/2003 | Nowicki et al. ........... 528/44 |
| 2004/0009428 | A1 | * | 1/2004 | Tamura et al. ......... 430/280.1 |
| 2010/0269242 | A1 | * | 10/2010 | Stubiger ..................... 2/81 |
| 2011/0151625 | A1 | * | 6/2011 | Hoshino et al. .......... 438/118 |
| 2011/0256382 | A1 | | 10/2011 | Jung |

FOREIGN PATENT DOCUMENTS

| | | | | |
|---|---|---|---|---|
| CN | 201752949 U | | 3/2011 | |
| JP | 5-47249 | | 2/1993 | |
| JP | 5-202340 | | 8/1993 | |
| JP | 6-25629 | | 2/1994 | |
| JP | 2001-49208 | | 2/2001 | |
| JP | 2002-138263 | | 5/2002 | |
| JP | 2003-306653 | | 10/2003 | |
| JP | 2003306653 A | * | 10/2003 | ............... C09J 7/02 |
| JP | 2004-002827 A | | 1/2004 | |
| JP | 2008-50423 | | 3/2008 | |
| JP | 2009-155532 | | 7/2009 | |
| JP | 2009155532 A | * | 7/2009 | |
| WO | WO 2008/149920 A1 | | 12/2008 | |
| WO | WO 2010/074451 A2 | | 7/2010 | |
| WO | WO 2011/122178 A1 | | 10/2011 | |

OTHER PUBLICATIONS

JP 2003306653 A Machine Translation.*
JP 200915532 A Machine Translation.*
Combined Office Action and Search Report issued on Jul. 3, 2014 in the corresponding China Patent Application No. 201280031415.4 (with Translation of Category of Cited Documents).
International Search Report issued Dec. 18, 2012, in PCT/JP12/072978 filed Sep. 7, 2012.
Extended European Search Report issued Mar. 27, 2015 in Patent Application No. 12833616.1.

* cited by examiner

*Primary Examiner* — Prashant J Khatri
*Assistant Examiner* — Travis Figg
(74) *Attorney, Agent, or Firm* — Oblon, McClelland, Maier & Neustadt, L.L.P.

(57) ABSTRACT

Provided is a flame retardant adhesive sheet having an adhesive agent layer on at least one surface of a base material, which even when the adhesive agent layer does not contain a flame retardant agent, has both excellent flame retardant properties and adhesive properties. The present invention is concerned with a flame retardant adhesive sheet including an adhesive agent layer on at least one surface of a base material, wherein the base material has flame retardant properties adapted to VTM-0 in a test according to the UL94 standard; a thickness per surface of the adhesive agent layer is 0.6 μm or more, and a total thickness of the adhesive agent layer is not more than 2.2 μm; the adhesive agent constituting the adhesive agent layer does not contain a flame retardant agent but contains (A) an acrylic copolymer and (B) a specified urethane resin.

15 Claims, 1 Drawing Sheet

(a)
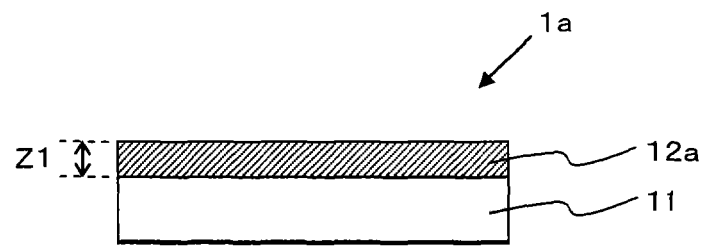
(b)
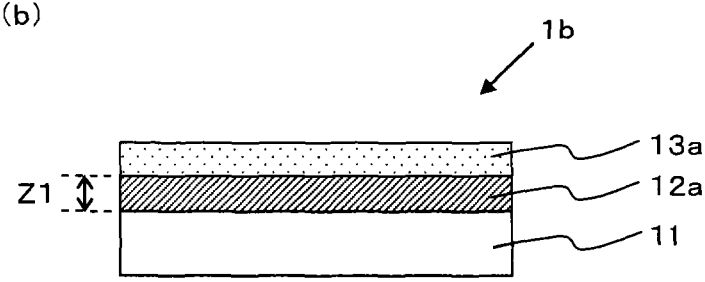
(c)
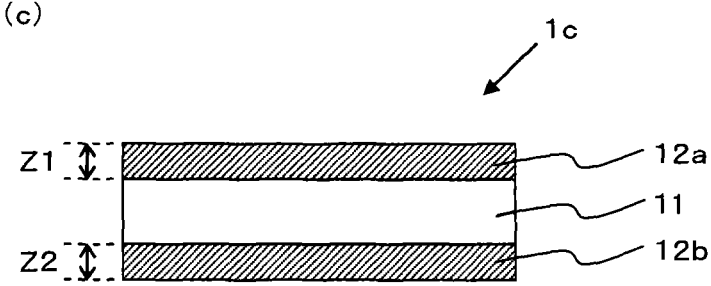

FLAME RETARDANT ADHESIVE SHEET

CROSS REFERENCE TO RELATED APPLICATIONS

The present application is a 35 U.S.C. §371 national stage patent application of International patent application PCT/JP2012/072978, filed on Sep. 7, 2012, published as WO/2013/042560 on Mar. 28, 2013, the text of which is incorporated by reference, and claims the benefit of the filing date of Japanese application no. 2011-207964, filed on Sep. 22, 2011, the text of which is also incorporated by reference.

TECHNICAL FIELD

The present invention relates to a flame retardant adhesive sheet. In detail, the present invention relates to a flame retardant adhesive sheet which even when an adhesive agent constituting an adhesive agent layer does not contain a flame retardant agent, has both excellent flame retardant properties and a high adhesive strength.

BACKGROUND ART

Flame retardant properties are required in members which are used in various fields inclusive of those related to electronic components or connected with electronic appliances, aircrafts, atomic power stations, and the like. In order to respond to this, the flame retardant properties are also imparted to members which are used in the above-described fields and adhesive tapes or sheets for immobilizing these members. As means for imparting flame retardant properties to the adhesive tapes or sheets, it is known to blend a flame retardant agent such as a halide, a phosphorus compound, aluminum hydroxide, magnesium hydroxide, melamine, etc. in a base material and/or an adhesive agent.

For example, PTLs 1 to 4 propose adhesive tapes in which an adhesive agent which does not have flame retardant properties is applied on a flame retardant base material using a flame retardant agent of every sort and kind.

On the other hand, PTL 5 proposes an adhesive agent containing an encapsulated solid flame retardant agent and an inorganic oxide.

Furthermore, PTL 6 proposes an adhesive tape in which by partially applying an adhesive agent which does not have flame retardant properties on the surface of a flame retardant base material, not only flame retardant properties of a film base material are not impaired, but adhesive properties are not conspicuously lowered.

CITATION LIST

Patent Literature

PTL 1: JP-A-5-47249
PTL 2: JP-A-5-202340
PTL 3: JP-A-2001-49208
PTL 4: JP-A-2002-138263
PTL 5: JP-A-6-25629
PTL 6: JP-A-2008-50423

SUMMARY OF INVENTION

Technical Problem

However, in the adhesive tapes disclosed in PTLs 1 to 4, the adhesive agent does not have flame retardant properties, and therefore, it may be easily estimated that the flame retardant properties are significantly lowered upon application of the adhesive agent.

In addition, as for the flame retardation with the solid flame retardant agent as disclosed in PTL 5, following the addition of the flame retardant agent, the adhesive agent becomes hard, so that the adhesive strength is lowered.

Furthermore, as for the adhesive tape disclosed in PTL 6, since the adhesive agent is partially applied, the production yield is lowered. In addition, in the case where the base material is thin, there is a concern that design properties are lowered due to a level difference generated by the above-described partial application.

Under such circumstances, an object of the present invention is to provide a flame retardant adhesive sheet in which both excellent flame retardant properties and adhesive strength are made compatible with each other, not only without using a flame retardant agent in an adhesive agent but without conducting partial application of an adhesive agent.

Solution to Problem

The present inventors have found that the above-described problem may be solved by an adhesive sheet having, on at least one surface of a flame retardant base material, an adhesive agent layer having a thickness of a specified range, which is constituted of a specified adhesive agent which does not contain a flame retardant agent.

Specifically, the present invention provides the following [1] to [10].

[1] A flame retardant adhesive sheet including an adhesive agent layer on at least one surface of a base material, wherein the base material has flame retardant properties adapted to VTM-0 in a test according to the UL94 standard; a thickness per surface of the adhesive agent layer is 0.6 μm or more, and a total thickness of the adhesive agent layer is not more than 2.2 μm; the adhesive agent constituting the adhesive agent layer does not contain a flame retardant agent but contains (A) an acrylic copolymer and (B) a urethane resin; and the urethane resin (B) is a urethane resin which is obtained by allowing an isocyanate-terminated urethane prepolymer obtained by a reaction between (b1) a polyol and (b2) a polyvalent isocyanate compound to react with (b3) a chain extender, the chain extender (b3) containing (b4) a compound having two hydroxyl groups and/or amino groups and (b5) a compound having three or more hydroxyl groups and/or amino groups, and the component (b4) and the component (b5) being allowed to react with each other in a proportion of from 70/30 to 100/0 in terms of a mass ratio [(b4)/(b5)].

[2] The flame retardant adhesive sheet as set forth above in [1], wherein the base material is a base material which contains neither a halogen based flame retardant agent nor a phosphorus based flame retardant agent.

[3] The flame retardant adhesive sheet as set forth above in [1], wherein the base material is a base material which does not contain a flame retardant agent.

[4] The flame retardant adhesive sheet as set forth above in any one of [1] to [3], wherein the base material is a base material composed of a polyimide resin, a polyaramid resin, a polyphenylene sulfide resin, or a polyetheretherketone resin, or a base material coated with such a resin.

[5] The flame retardant adhesive sheet as set forth above in any one of [1] to [4], wherein the polyol (b1) is a glycol having a weight average molecular weight of from 1,000 to 3,000.

[6] The flame retardant adhesive sheet as set forth above in any one of [1] to [5], wherein the adhesive agent constituting the adhesive agent layer further contains (C) a crosslinking agent, and the acrylic copolymer (A) has a crosslinking functional group capable of reacting with the crosslinking agent (C).

[7] The flame retardant adhesive sheet as set forth above in [6], wherein the crosslinking functional group is a carboxy group and/or a hydroxyl group.

[8] The flame retardant adhesive sheet as set forth above in [6] or [7], wherein the crosslinking agent (C) is an isocyanate based crosslinking agent.

[9] The flame retardant adhesive sheet as set forth above in any one of [1] to [8], wherein a mass ratio [(A)/(B)] of the acrylic copolymer (A) to the urethane resin (B) is from 1/99 to 40/60.

[10] The flame retardant adhesive sheet as set forth above in any one of [1] to [9], wherein a weight average molecular weight (Mw) of the acrylic copolymer (A) is from 300,000 to 1,500,000.

Advantageous Effects of Invention

In the flame retardant adhesive sheet of the present invention, by using a specified adhesive agent, the adhesive agent layer can be reduced in thickness while having sufficient adhesive properties, and therefore, even when the adhesive agent constituting the adhesive agent layer does not contain a flame retardant agent, a sheet having both excellent flame retardant properties and adhesive properties can be provided.

BRIEF DESCRIPTION OF DRAWING

FIG. 1 is a cross-section view of a flame retardant adhesive sheet showing an embodiment of a configuration of a flame retardant adhesive sheet of the present invention.

DESCRIPTION OF EMBODIMENTS

The flame retardant adhesive sheet of the present invention is a flame retardant adhesive sheet having an adhesive agent layer on at least one surface of a base material, and the configuration of the flame retardant adhesive sheet is not particularly limited so long as the adhesive agent layer is provided on one surface or both surfaces of the base material.

FIG. 1 is a view showing an embodiment of a configuration of the flame retardant adhesive sheet of the present invention. The configuration of the flame retardant adhesive sheet of the present invention is not limited to a flame retardant adhesive sheet 1a having an adhesive agent layer 12a on one surface of a base material 11 as shown in FIG. 1 (a) but may also be a flame retardant adhesive sheet 1b in which a release sheet 13a is further laminated on the adhesive agent layer 12a formed on one surface of the base material 11 as shown in FIG. 1(b).

In addition, the flame retardant adhesive sheet of the present invention may also be a flame retardant adhesive sheet 1c having adhesive agent layers 12a and 12b on both surfaces of the base material 11 as shown in FIG. 1(c), or may also be a flame retardant adhesive sheet in which release sheets 13a and 13b (not shown) are further laminated on the adhesive agent layers 12a and 12b, respectively.

[Base Material]

The base material which is used in the flame retardant adhesive sheet of the present invention may be a base material having flame retardant properties adapted to VTM-0 in a test according to the UL94 standard and is preferably a resin-made base material. The terms "adapted to VTM-0 in a test according to the UL94 standard" as referred to in the present invention mean that the VTM rank is decided to be VTM-0 in a test according to the thin material vertical burning test method of the flame retardant test standard of plastic materials UL 94, published by Underwriters Laboratories Inc.

As such a base material, a base material composed of a resin having flame retardant properties by a resin itself, a base material composed of a resin containing a flame retardant agent, a base material coated with the above-described resin, and the like can be used.

Examples of the resin having flame retardant properties by a resin itself include polyimide resins such as polyether imide resins, polyphenylene ether imide resins, etc., polyphenylene sulfide resins, polyetheretherketone resins, and the like.

Examples of the resin which is used in the base material composed of a resin containing a flame retardant agent include, in addition to the above-described resins having flame retardant properties by a resin itself, polycarbonate resins, polystyrene resins, polyethylene resins, polyester resins, polyolefin resins, polyurethane resins, phenol resins, urea resins, EVA resins, acrylic resins, acrylonitrile butadiene resin (ABS resins), epoxy resins, polystyrene-polycarbonate alloy resins, polystyrene-ABS alloy resins, polyamide resins, and the like.

Examples of the flame retardant agent include halogen based flame retardant agents, phosphorus based flame retardant agents, organic flame retardant agents such as silicone based compounds, melamine based compounds, hindered amine based compounds, guanidine based compounds, etc., and inorganic flame retardant agents such as antimony based compounds, metal hydroxide compounds, etc. The above-described flame retardant agents may be used solely or in combination of two or more kinds thereof.

In addition, a base material coated with the resin having flame retardant properties by a resin itself or the resin containing a flame retardant agent as described above may be used, too. Examples of the base material in that case include base materials obtained by coating any one of the above-described resins on a sheet-shaped or film-shaped plastic, paper such as impregnated paper, etc., a metal foil, a woven fabric, a nonwoven fabric, or the like.

Among the above-described base materials, from the viewpoint of flame retardant properties, a base material composed of a polyimide resin, a polyaramid resin, a polyphenylene sulfide resin, or a polyetheretherketone resin, or a base material coated with such a resin is preferable.

In addition, from the viewpoint of environmental response, a base material which does not substantially contain any of halogen based flame retardant agents and phosphorus flame retardant agents is preferable, and in particular, it is preferable to use a base material which does not substantially contain any flame retardant agent.

Specific product examples of the base material which is used in the flame retardant adhesive sheet of the present invention include LUMIRROR ZV10 (a trade name for a film obtained by coating a polyethylene terephthalate film with a polyimide resin, manufactured by Toray Industries, Inc.), TORELINA (a trade name for a polyphenylene sulfide resin film, manufactured by Toray Industries, Inc.), MICTRON (a trade name for a polyaramid resin film, manufactured by Toray Industries, Inc.), KAPTON (a trade name for a polyimide resin film, manufactured by Du Pont-Toray Co., Ltd.), SUPERIO UT (a trade name for a polyether imide based resin film, manufactured by Mitsubishi Plastics, Inc.), DIALAMY (a trade name for a flame retardant agent-containing polyethylene terephthalate resin film, manufactured by Mitsubishi Plastics, Inc.), and the like.

In addition, examples thereof further include LAXRON Polycarbonate SDB-3 (a trade name for a flame retardant agent-containing polycarbonate resin film, manufactured by Tokiwa Electric Co., Ltd.), SUNLOID BARRIER (a trade name for a polyphenylene ether based resin film, manufactured by Sumitomo Bakelite Co., Ltd.), SUNLOID PC ECO-SHEET (a trade name for a non-halogen flame retardant agent-containing polycarbonate resin film, manufactured by Sumitomo Bakelite Co., Ltd.), ULTEM (a trade name for a polyether imide resin film, manufactured by Asahi Glass Co., Ltd.), LEXAN (a trade name for a polycarbonate based resin film, manufactured by Asahi Glass Co., Ltd.), VALOX (a trade name for a polybutylene terephthalate based resin film, manufactured by Asahi Glass Co., Ltd.), SAFETY FILM (a trade name for a polyethylene based resin film, manufactured by Ooida Co., Ltd.), and the like. Incidentally, the base material is not limited to these product examples.

Though a thickness of the base material is properly determined depending upon an application of the flame retardant adhesive sheet, it is generally from 1 to 100 µm, preferably from 5 to 100 µm, and more preferably from 10 to 80 µm.

[Adhesive Agent Layer]

The flame retardant adhesive sheet of the present invention is one having an adhesive agent layer on at least one surface of the above-described base material.

In the flame retardant adhesive sheet of the present invention, from the viewpoint of making both flame retardant properties and adhesive properties compatible with each other, a thickness per surface of the adhesive agent layer is 0.6 µm or more, and a total thickness of the adhesive agent layer is not more than 2.2 µm. When the thickness per surface of the adhesive agent layer is less than 0.6 µm, a sufficient adhesive strength is not obtained, and when the total thickness of the adhesive agent layer exceeds 2.2 µm, sufficient flame retardant properties are not obtained.

Incidentally, the "thickness per surface of the adhesive agent layer" as referred to in the present invention means each thickness of the adhesive agent layer provided on one surface or both surfaces of the base material (each of Z1 and Z2 in FIGS. 1(a) to 1(c)), and the "total thickness of the adhesive agent layer" as referred to in the present invention means a total thickness of the adhesive agent layer provided on one surface or both surfaces of the base material (for example, Z1 in FIGS. 1(a) and 1(b), and (z1+Z2) in FIG. 1(c)).

In the case where the adhesive agent layer is provided on only one surface of the base material, the thickness per surface of the adhesive agent layer is 0.6 µm or more, preferably from 0.8 to 2.1 µm, and more preferably from 1.0 to 1.4 µm.

In the case where the adhesive agent layer is provided on both surfaces of the base material, the thickness per surface of the adhesive agent layer is 0.6 µm or more, preferably from 0.8 to 1.6 µm, and more preferably from 1.0 to 1.4 µm. In addition, the total thickness of the adhesive agent layer is not more than 2.2 µm, preferably from 0.6 to 2.1 µm, and more preferably from 0.8 to 2.0 µm.

<Adhesive Agent>

The adhesive agent constituting the adhesive agent layer which is used in the present invention is characterized in that it does not contain a flame retardant agent. The fact that the adhesive agent does not contain a flame retardant agent is preferable from the viewpoint of environmental response and from the viewpoint of adhesive strength of the adhesive sheet. Incidentally, the "flame retardant agent" as referred to herein is the same as the flame retardant agent as described above in the base material, and the terms "does not contain a flame retardant agent" mean that the adhesive agent does not substantially contain any of the above-described flame retardant agents.

In addition, the adhesive agent contains (A) an acrylic copolymer and (B) a urethane resin, and it can further contain (C) a crosslinking agent, other additives, an organic solvent, and the like as the need arises. Each of the components which are contained in the adhesive agent is hereunder described.

((A) Acrylic Copolymer)

The adhesive agent which is used in the present invention contains (A) an acrylic copolymer. In the present invention, the acrylic copolymer (A) is an acrylic copolymer obtained through a polymerization reaction using a monomer mixture composed mainly of a (meth)acrylic acid ester as a raw material. For that reason, the acrylic copolymer (A) which is used contains at least a constituent unit derived from a (meth)acrylic acid ester.

Incidentally, for example, the "(meth)acrylic acid" as referred to in the following description means both acrylic acid and methacrylic acid, and other analogous terminologies are also the same.

From the viewpoint of obtaining a sufficient adhesive strength even when the adhesive agent layer is reduced in thickness, the content of the constituent unit derived from a (meth)acrylic acid ester is preferably from 70 to 99.9% by mass, more preferably from 80 to 99.5% by mass, still more preferably from 85 to 99% by mass, and yet still more preferably from 88 to 95% by mass in the whole of the constituent units of the component (A).

Incidentally, the copolymerization mode of the acrylic copolymer (A) is not particularly limited but may be any of random, block, and graft copolymers.

Examples of the (meth)acrylic acid ester which is a main component monomer of the above-described acrylic copolymer include methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, stearyl (meth)acrylate, and the like. Of these, from the viewpoint of obtaining a sufficient adhesive strength even when the adhesive agent layer is reduced in thickness, butyl (meth)acrylate is preferable.

These (meth)acrylic acid esters may be used solely or in combination of two or more kinds thereof. Incidentally, in the case of using a combination of two or more kinds of (meth) acrylic acid esters, from the viewpoint of obtaining a sufficient adhesive strength even when the adhesive agent layer is reduced in thickness, the content of butyl acrylate is preferably from 50 to 100% by mass, more preferably from 70 to 100% by mass, and still more preferably from 80 to 100% by mass in the used (meth)acrylic acid esters.

The acrylic copolymer (A) is preferably an acrylic copolymer having a crosslinking functional group, which is obtained by polymerizing a monomer mixture containing the above-described (meth)acrylic acid ester and a monomer having a crosslinking functional group.

The crosslinking functional group as referred to herein is a functional group capable of reacting with a crosslinking agent that is a component (C) as described later, and examples thereof include a carboxy group, a hydroxyl group, an amino group, and the like. Of these, from the viewpoint of reactivity with the crosslinking agent as the component (C), a carboxy group and/or a hydroxyl group is preferable, and from the viewpoint of obtaining a higher adhesive strength, a carboxy group is more preferable. Incidentally, the "carboxyl group and/or hydroxyl group" refers to at least one member selected from a carboxy group and a hydroxyl group.

Examples of the monomer having a crosslinking functional group include ethylenically unsaturated carboxylic acids such as (meth)acrylic acid, itaconic acid, crotonic acid, maleic acid, fumaric acid, etc.; (meth)acrylic acid hydroxyalkyl esters such as 2-hydroxyethyl (meth)acrylate, 4-hydroxybutyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, etc.; monoalkylaminoalkyl (meth)acrylates such as monomethylaminoethyl (meth)acrylate, monoethylaminoethyl (meth)acrylate, monomethylaminopropyl (meth)acrylate, monoethylaminopropyl (meth)acrylate, etc.; and the like. Incidentally, these monomers may be used solely or in combination of two or more kinds thereof.

Of these, from the viewpoint of reactivity with the crosslinking agent and from the viewpoint of obtaining a sufficiently high adhesive strength even when the adhesive agent layer is reduced in thickness, ethylenically unsaturated carboxylic acids and (meth)acrylic acid hydroxyalkyl esters are preferable, ethylenically unsaturated carboxylic acids are more preferable, and (meth)acrylic acid is still more preferable.

From the viewpoint of obtaining a sufficient adhesive strength even in the case where the adhesive agent layer is reduced in thickness, the content of the monomer having a crosslinking functional group is preferably from 0.1 to 20% by mass, more preferably from 0.5 to 15% by mass, and still more preferably from 1 to 12% by mass in the monomer mixture that is the raw material of the acrylic copolymer.

The acrylic copolymer (A) may also contain, as a constituent unit, a constituent unit derived from a monomer other than those described above (hereinafter referred to as "other monomer").

Examples of other monomer include vinyl esters such as vinyl acetate, vinyl propionate, etc.; olefins such as ethylene, propylene, isobutylene, etc.; halogenated olefins such as vinyl chloride, vinylidene chloride, etc.; aromatic vinyl monomers such as styrene, methylstyrene, vinyltoluene, etc.; diene based monomers such as butadiene, isoprene, chloroprene, etc.; nitrile based monomers such as (meth)acrylonitrile, etc.; and the like. These monomers may be used solely or in combination of two or more kinds thereof.

A method for obtaining the acrylic copolymer (A) from such a monomer mixture is not particularly limited but can be conducted in the presence or absence of a solvent by a known polymerization method. Examples of the solvent which is used include ethyl acetate, toluene, and the like.

In addition, on the occasion of polymerization reaction, a polymerization initiator may be used. Examples of the polymerization initiator include azobisisobutyronitrile, benzoyl peroxide, and the like. A blending amount of such a polymerization initiator is preferably from 0.01 to 1 part by mass, and more preferably from 0.1 to 0.5 parts by mass based on 100 parts by mass of the monomer mixture.

In addition, though the polymerization condition is not particularly limited, the polymerization is preferably conducted under a condition at a polymerization temperature of from 50 to 90° C. for a reaction time of from 2 to 30 hours.

From the viewpoint of enhancing an adhesive performance and the like, a weight average molecular weight (Mw) of the thus obtained acrylic copolymer (A) is preferably from 300,000 to 1,500,000, more preferably from 400,000 to 1,000,000, and still more preferably from 500,000 to 800,000. When the weight average molecular weight (Mw) of the acrylic copolymer (A) is 300,000 or more, a cohesive strength of the adhesive agent layer is enhanced, and a sufficient adhesive strength is obtained. In addition, when the weight average molecular weight (Mw) of the acrylic copolymer (A) is not more than 1,500,000, an elastic modulus of the adhesive agent layer does not become excessively high, and lowering of the adhesive strength can be suppressed.

Incidentally, in the present invention, the weight average molecular weight (Mw) means a value as reduced into standard polystyrene, which is measured by means of the gel permeation chromatography (GPC) method, and specifically, it means a value measured by the method described in the Examples (hereinafter the same).

<(B) Urethane Resin>

The adhesive agent which is used in the present invention contains (B) a urethane resin (hereinafter also referred to as "component (B)"). In view of the fact that the adhesive agent contains the urethane resin (B), even when the adhesive agent layer is reduced in thickness, a sufficiently high adhesive strength can be obtained.

In the present invention, from the viewpoints of obtaining an adhesive agent having an adequate elastic modulus and obtaining a sufficient adhesive strength even when the adhesive agent layer is reduced in thickness, a mass ratio of the acrylic copolymer (A) to the urethane resin (B) [(A)/(B)] is preferably from 1/99 to 40/60, more preferably from 5/95 to 30/70, and still more preferably from 10/90 to 25/75. When the mass ratio expressing a proportion of the component (A) to the component (B) is 1/99 or more, lowering of the adhesive strength to be brought due to excessive lowering of the elastic modulus can be avoided, whereas when it is not more than 40/60, a lowering of the adhesive strength to be brought due to an excessive increase of the elastic modulus can be avoided.

The urethane resin (B) which is used in the present invention is preferably a urethane resin which is obtained by allowing an isocyanate-terminated urethane prepolymer obtained by a reaction between (b1) a polyol and (b2) a polyvalent isocyanate compound to react with (b3) a chain extender.

Though a compound having two or more hydroxyl groups in a molecule thereof can be used as the polyol (b1), from the viewpoint of suppressing gelation, it is preferable to use a diol.

Examples of the polyol (b1) include alkane diols such as 1,3-propanediol, 1,4-butanediol, 1,5-pentanediol, neopentyl glycol, 1,6-hexanediol, 1,7-heptanediol, etc.; alkylene glycols such as ethylene glycol, propylene glycol, diethylene glycol, dipropylene glycol, etc.; polyalkylene glycols such as polyethylene glycol, polypropylene glycol, polybutylene glycol, etc.; and polyoxyalkylene glycols such as polytetramethylene glycol, etc. Incidentally, these polyols (b1) may be used solely or in combination of two or more kinds thereof.

Of these polyols (b1), from the viewpoint of suppressing gelation in the reaction of the obtained isocyanate-terminated urethane prepolymer with the chain extender (b3), glycols having a weight average molecular weight of from 1,000 to 3,000 are preferable, and polyalkylene glycols having a weight average molecular weight of from 1,000 to 3,000 are more preferable.

Examples of the polyvalent isocyanate compound (b2) include aromatic polyisocyanates, aliphatic polyisocyanates, alicyclic polyisocyanates, and the like.

Examples of the aromatic polyisocyanate include 1,3-phenylene diisocyanate, 1,4-phenylene diisocyanate, 4,4'-diphenylmethanediisocyanate, 2,4-tolylenediisocyanate, 2,6-tolylene diisocyanate, 4,4'-toluidine diisocyanate, 2,4,6-triisocyanate toluene, 1,3,5-triisocyanate benzene, dianisidine diisocyanate, 4,4'-diphenylether diisocyanate, 4,4',4"-triphenylmethane triisocyanate, 1,4-tetramethylxylylene diisocyanate, 1,3-tetramethylxylylene diisocyanate, and the like.

Examples of the aliphatic polyisocyanate include trimethylene diisocyanate, tetramethylene diisocyanate, hexamethylene diisocyanate, pentamethylene diisocyanate, 1,2-propylene diisocyanate, 2,3-butylene diisocyanate, 1,3-butylene diisocyanate, dodecamethylene diisocyanate, 2,4,4-trimethylhexamethylene diisocyanate, and the like.

Examples of the alicyclic polyisocyanate include 3-isocyanatomethyl-3,5,5-trimethylcyclohexyl isocyanate, 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate), 1,4-bis(isocyanatomethyl)cyclohexane, 1,4-bis(isocyanatomethyl)cyclohexane, and the like.

Incidentally, the polyvalent isocyanate compound (b2) may be a trimethylolpropane adduct type modified product, a biuret type modified product obtained by a reaction with water, or an isocyanurate type modified product having an isocyanurate ring incorporated thereinto of the above-described polyisocyanate.

Of these polyvalent isocyanate compounds (b2), one or more members selected from 4,4'-diphenylmethane diisocyanate, 2,4-tolylene diisocyanate, 2,6-tolylene diisocyanate, hexamethylene diisocyanate, 3-isocyanatomethyl-3,5,5-trimethylcyclohexyl isocyanate, and modified products thereof are preferable from the viewpoint of physical properties of the adhesive agent. From the viewpoint of weather resistance, one or more members selected from hexamethylene diisocyanate, 3-isocyanatomethyl-3,5,5-trimethylcyclohexyl isocyanate, and modified products thereof are more preferable. Hexamethylene diisocyanate and modified products thereof are further preferable.

A method for preparing the isocyanate-terminated urethane prepolymer is not particularly limited, and examples thereof include a method in which the components (b1) and (b2), a urethanization catalyst which is optionally added, and a solvent which is optionally added, are charged into a reactor and allowed to react with each other, and the like.

From the viewpoint of allowing an isocyanate group to present in the end, the reaction is preferably conducted such that a blending ratio of the components (b1) and (b2) is preferably from 1.1 to 3.0, and more preferably from 1.2 to 2.5, in terms of a NCO group/OH group (molar ratio). When the blending ratio is 1.1 or more, gelation can be prevented from occurring, so that a tendency of thickening can be suppressed. On the other hand, when it is not more than 3.0, a concentration of the unreacted polyvalent isocyanate compound in the isocyanate-terminated urethane prepolymer does not become excessively high, so that the reaction with the chain extender (b3) as described later can be made to proceed smoothly.

In addition, though the content of the isocyanate group (NCO %) in the isocyanate-terminated urethane prepolymer varies depending upon the reactivity between the components (b1) and (b2) to be used or the blending amount of the chain extender (b3), it is preferably from 0.5 to 12% by mass, and more preferably from 1 to 4% by mass, in terms of a value measured in conformity with JIS K1603. When the content of the isocyanate group is 0.5% by mass or more, the reaction with the chain extender (b3) can be made to sufficiently proceed, whereas when it is not more than 12% by mass, the reaction with the chain extender (b3) can be sufficiently controlled.

Though the catalyst which is used in the reaction for forming the isocyanate-terminated urethane prepolymer is not particularly limited, examples thereof include tertiary amine based compounds, organic metal based compounds, and the like.

Examples of the tertiary amine based compound include triethylamine, triethylenediamine, N,N-dimethylbenzylamine, N-methylmorpholine, 1,8-diazabicyclo[5.4.0]undecene-7 (DBU), and the like.

Examples of the organic metal based compound include tin based compounds and non-tin based compounds.

Examples of the tin based compound include dibutyltin dichloride, dibutyltin oxide, dibutyltin dibromide, dibutyltin dimaleate, dibutyltin dilaurate (DBTDL), dibutyltin diacetate, dibutyltin sulfide, tributyltin sulfide, tributyltin oxide, tributyltin acetate, triethyltin ethoxide, tributyltin ethoxide, dioctyltin oxide, tributyltin chloride, tributyltin trichloroacetate, tin 2-ethylhexanoate, and the like.

Examples of the non-tin based compound include titanium based compounds such as dibutyltitanium dichloride, tetrabutyl titanate, butoxytitanium trichloride, etc.; lead based compounds such as lead oleate, lead 2-ethylhexanoate, lead benzoate, lead naphthenate, etc.; iron based compounds such as iron 2-ethylhexanoate, iron acetyl acetonate, etc.; cobalt based compounds such as cobalt benzoate, cobalt 2-ethylhexanoate, etc.; zinc based compounds such as zinc naphthenate, zinc 2-ethylhexanoate, etc.; zirconium naphthenate; and the like.

Of these catalysts, DBTDL, tin 2-ethylhexanoate, and tetrabutyl titanate are preferable, and DBTDL is more preferable. Incidentally, these catalysts may be used solely or in combination of two or more kinds thereof.

The addition amount of the catalyst which is used in the reaction is preferably from 0.0001 to 1 part by mass, and more preferably from 0.005 to 0.1 parts by mass, based on 100 parts by mass of the component (b1) from the viewpoint of reactivity.

In addition, examples of the solvent which is used in the reaction as the need arises include aromatic hydrocarbons such as toluene, xylene, etc., aliphatic hydrocarbons such as hexane, etc., esters such as ethyl acetate, butyl acetate, etc., ketones such as methyl ethyl ketone (MEK), etc., dimethylformamide, cyclohexanone, and the like. These solvents may be used solely or in combination of two or more kinds thereof.

A reaction temperature in the reaction is preferably not higher than 120° C., and more preferably from 70 to 100° C. When the reaction temperature is not higher than 120° C., the progress of an allophanate reaction is suppressed, the isocyanate-terminated urethane prepolymer having prescribed molecular weight and structure can be synthesized, and the reaction rate can be sufficiently controlled. Incidentally, for example, in the case where the reaction temperature is from 70 to 100° C., a reaction time in the reaction is preferably from 2 to 20 hours.

The thus obtained isocyanate-terminated urethane prepolymer is formed into a urethane resin through a chain extension reaction with the chain extender (b3).

The chain extender (b3) contains (b4) a compound having two hydroxyl groups and/or amino groups and (b5) a compound having three or more hydroxyl groups and/or amino groups, the component (b4) and the component (b5) being allowed to react with each other in a proportion of from 70/30 to 100/0 in terms of a mass ratio [(b4)/(b5)]. Incidentally, the "compound having two hydroxyl groups and/or amino groups" refers to a compound having two functional groups selected from a hydroxyl group and an amino group, and the "compound having three or more hydroxyl groups and/or amino groups" refers to a compound having three or more functional group selected from a hydroxyl group and an amino group.

The component (b4) is not particularly limited so long as it is a compound having two hydroxyl groups and/or amino groups. In view of the fact that lowering of the adhesive strength can be more prevented from occurring, at least one compound selected from the group consisting of aliphatic diols, aliphatic diamines, alkanolamines, bisphenols, and aromatic diamines is preferable.

Examples of the aliphatic diol include alkanediols such as 1,3-propanediol, 1,4-butanediol, 1,5-pentanediol, neopentyl glycol, 1,6-hexanediol, 1,7-heptanediol, etc.; and alkylene glycols such as ethylene glycol, propylene glycol, diethylene glycol, dipropylene glycol, etc.

Examples of the aliphatic diamine include ethylenediamine, 1,3-propanediamine, 1,4-butanediamine, 1,5-pentanediamine, 1,6-hexanediamine, and the like.

Examples of the alkanolamine include monoethanolamine, monopropanolamine, isopropanolamine, and the like.

Examples of the bisphenol include bisphenol A and the like.

Examples of the aromatic diamine include diphenylmethanediamine, tolylenediamine, xylylenediamine, and the like. Incidentally, these compounds may be used solely or in combination of two or more kinds thereof.

The component (b5) is not particularly limited so long as it is a compound having three or more hydroxyl groups and/or amino groups. Examples thereof include polyols such as trimethylolpropane, ditrimethylolpropane, pentaerythritol, dipentaerythritol, etc.; amino alcohols such as 1-amino-2,3-propanediol, 1-methylamino-2,3-propanediol, N-(2-hydroxypropylethanolamine), etc.; an ethylene oxide or propylene oxide adduct of tetramethylxylylenediamine; and the like. Incidentally, these compounds may be used solely or in combination of two or more kinds thereof.

The amino group and/or hydroxyl group in the components (b4) and (b5) is preferably a primary amino group, a secondary amino group, or a primary hydroxyl group from the viewpoint of reactivity with the isocyanate group.

Furthermore, among the above compounds, an aliphatic diol is more preferable and an alkanediol is further preferable as the component (b4), and a polyol is more preferable and trimethylolpropane is further preferable as the component (b5).

A mass ratio of the component (b4) and the component (b5) to be blended ((b4)/(b5)) is from 70/30 to 100/0, preferably from 75/25 to 95/5, and more preferably from 80/20 to 90/10. In the case where the mass ratio indicating a ratio of the component (b4) to the component (b5) is 70/30 or more, even when the adhesive agent layer is reduced in thickness, lowering of the adhesive strength can be suppressed, and at the time of the chain extension reaction for obtaining a urethane resin, gelation can be avoided, and a desired adhesive agent can be obtained.

Examples of the chain extension reaction include (1) a method in which a solution of the isocyanate-terminated urethane prepolymer is charged into a reactor, the chain extender is added dropwise in the reactor, and the mixture is allowed to react with each other; (2) a method in which the chain extender is charged into a reactor, a solution of the isocyanate-terminated urethane prepolymer is added dropwise, and the mixture is allowed to react with each other; and (3) a method in which a solution of the isocyanate-terminated urethane prepolymer is diluted with a solvent, a prescribed amount of the chain extender is then added collectively in a reactor, and the mixture is allowed to react with each other. In view of the fact that a resin having a uniform composition is easily obtainable because the isocyanate group is gradually decreased, the method (1) or (3) is preferable.

As the solvent, there can be used the same solvent as used in the reaction for forming the isocyanate-terminated urethane prepolymer.

A reaction temperature in the chain extension reaction is preferably from 20 to 80° C. When the reaction temperature is 20° C. or higher, the chain extension reaction can be advanced at a sufficient rate. On the other hand, when the reaction temperature is not higher than 80° C., the reaction rate can be sufficiently controlled, and a urethane resin having desired molecular weight and structure is obtained. Incidentally, in the case of conducting the chain extension reaction in the presence of a solvent, the reaction temperature is preferably not higher than a boiling point of the solvent, and in particular, the reaction temperature is preferably from 40 to 60° C. in the presence of MEK or ethyl acetate.

Incidentally, for example, in the case where the reaction temperature is from 40 to 80° C., the reaction time in the chain extension reaction is preferably from 1 to 20 hours.

Incidentally, a terminal stopping agent may be used, too for the purpose of stopping the chain extension reaction.

Examples of the terminal stopping agent include a compound having only one hydrogen capable of reacting with an isocyanate group and a compound having only one amino group.

Examples of the compound having only one hydrogen capable of reacting with an isocyanate group include monool compounds such as methanol, ethanol, etc.

As the compound having only one amino group, there can be used a compound having only one primary amino group or secondary amino group, and examples thereof include diethylamine, morpholine, and the like.

The compound having only one primary amino group has two reactive hydrogens; however, after one of the reactive hydrogens has reacted, the remaining reactive hydrogen has low reactivity, and hence, the compound becomes substantially equivalent to a monofunctional compound.

The addition amount of the terminal stopping agent is preferably an amount at which a proportion of the terminal stopping agent is 1 mole or more and not more than 2 moles per mole of the terminal isocyanate group remaining after the chain extension reaction. When the addition amount of the terminal stopping agent is 1 mole or more, the isocyanate group does not retain after the terminating reaction, so that the obtained urethane resin is stable. On the other hand, when the addition amount of the terminal stopping agent is not more than 2 moles, there is a tendency that a urethane resin having a low molecular weight decreases.

A weight average molecular weight of the urethane resin (B) is preferably from 10,000 to 300,000, more preferably from 30,000 to 250,000, and still more preferably from 50,000 to 200,000. When the weight average molecular weight of the urethane resin (B) is 10,000 or more, there is a tendency that adhesive properties, in particular, an adhesive holding power is enhanced, and such is preferable, whereas when it is not more than 300,000, gelation can be prevented from occurring.

<(C) Crosslinking Agent>

In the case of using the acrylic copolymer having a crosslinking functional group as the component (A), from the viewpoint of increasing a cohesive strength to obtain a desired adhesive strength, it is preferable that the adhesive agent which is used in the present invention contains a crosslinking agent capable of reacting with the crosslinking functional group in the component (A).

Examples of the crosslinking agent include isocyanate based crosslinking agents, epoxy based crosslinking agents, aziridine based crosslinking agents, metal chelate based crosslinking agents, amine based crosslinking agents, amino resin based crosslinking agents, and the like.

Examples of the isocyanate based crosslinking agent include polyvalent isocyanate compounds such as 2,4-tolylene diisocyanate, 2,6-tolylene diisocyanate, 1,3-xylylene diisocyanate, 1,4-xylylene diisocyanate, 4,4'-diphenylmethane diisocyanate, 2,4'-diphenylmethane diisocyanate, 3-methyldiphenylmethane diisocyanate, hexamethylene diisocyanate, 3-isocyanatomethyl-3,5,5-trimethylcyclohexyl isocyanate, 4,4'-methylenebis(cyclohexyl isocyanate), 2,4'-methylenebis(cyclohexyl isocyanate), lysine isocyanate, etc.

Incidentally, the polyvalent isocyanate compound may be a trimethylolpropane adduct type modified product, a biuret type modified product obtained by a reaction with water, or an isocyanurate type modified product containing an isocyanurate ring of the above-described compound.

The epoxy based crosslinking agent is not particularly limited so long as it has two or more epoxy groups or glycidyl groups in a molecule thereof. However, polyfunctional epoxy compounds having two or more glycidyl groups in a molecule thereof are preferable.

Examples of the polyfunctional epoxy compound containing two or more glycidyl groups in a molecule thereof include a diglycidyl ether of bisphenol A and an oligomer thereof, a diglycidyl ether of hydrogenated bisphenol A and an oligomer thereof, diglycidyl orthophthalate, diglycidyl isophthalate, diglycidyl terephthalate, glycidyl p-oxybenzoate, diglycidyl tetrahydrophthalate, diglycidyl hexahydrophthalate, diglycidyl succinate, diglycidyl adipate, diglycidyl sebacate, ethylene glycol diglycidyl ether, propylene glycol diglycidyl ether, 1,4-butanediol diglycidyl ether, 1,6-hexanediol diglycidyl ether, a polyalkylene glycol diglycidyl ether, triglycidyl trimellitate, triglycidyl isocyanurate, 1,4-diglycidyloxybenzene, diglycidylpropyleneurea, glycerol triglycidyl ether, trimethylolpropane di- or triglycidyl ether, pentaerythritol di- or triglycidyl ether, a triglycidyl ether of a glycerol alkylene oxide adduct, a diglycidylamine such as diglycidylaniline, etc., and the like.

Though the aziridine based crosslinking agent is not particularly limited, specific examples thereof include 1,1'-(methylene-di-p-phenylene)bis-3,3-aziridinylurea, 1,1'-(hexamethylene)bis-3,3-aziridinylurea, 2,4,6-triaziridinyl-1,3,5-triazine, trimethylolpropane-tris-(2-aziridinylpropionate), and the like.

Examples of the metal chelate based crosslinking agent include compounds in which acetylacetone, ethyl acetoacetate, or the like coordinates on a polyvalent metal such as aluminum, iron, copper, zinc, tin, titanium, nickel, antimony, magnesium, vanadium, chromium, zirconium, etc., and the like.

Examples of the amine based crosslinking agent include polyamines such as aliphatic polyamines (for example, triethylenetetramine, tetraethylenepentamine, ethylenediamine, N,N-dicinnamylidene-1,6-hexanediamine, trimethylenediamine, hexamethylenediamine carbamate, ethanolamine, 3,9-bis(3-aminopropyl)-2,4,8,10-tetraoxa-2-spiro[5.5]undecane, etc.) and salts thereof; and aromatic polyamines (for example, diaminodiphenylmethane, xylylenediamine, phenylenediamine, diaminodiphenyl sulfone, etc.).

Examples of the amino resin based crosslinking agent include methoxylated methylolurea, methoxylated methylol N,N-ethyleneurea, methoxylated methyloldicyanediamide, methoxylated methylolmelamine, methoxylated methylolbenzoguanamine, butoxylated methylolmelamine, butoxylated methylolbenzoguanamine, and the like, with methoxylated methylolmelamine, butoxylated methylolmelamine, methylolated benzoguanamine, and the like being preferable.

Of these, from the viewpoint of obtaining a high adhesive strength even when the adhesive agent layer is reduced in thickness, isocyanate based crosslinking agents are preferable, and tolylene diisocyanates and modified products thereof are more preferable. Incidentally, the above-described crosslinking agents may be used solely or in combination of two or more kinds thereof.

From the viewpoint of obtaining a high adhesive strength even when the adhesive agent layer is reduced in thickness, the content of the crosslinking agent (C) is preferably from 0.01 to 8 parts by mass, more preferably from 0.05 to 5 parts by mass, and still more preferably from 0.1 to 3 parts by mass based on 100 parts by mass of a total sum of the component (A) and the component (B).

<Other Components>

The adhesive agent which is used in the present invention can be blended with other components within the range where the effects of the present invention are not impaired. Examples of other components include an ultraviolet absorber, an antioxidant, an antiseptic, an anti-mold agent, a plasticizer, a defoaming agent, a wettability regulator, and the like.

[Release Sheet]

For example, as shown in FIG. 1(b), the flame retardant adhesive sheet of the present invention may also be a flame retardant adhesive sheet obtained by laminating a release sheet on the adhesive agent layer.

Though the release sheet which is used in the flame retardant adhesive sheet according of the present invention is not particularly limited, a release sheet obtained by applying a release agent on a sheet base material is preferable from the viewpoint of easiness of handling. The release sheet may be either a release sheet obtained by applying a release agent on both surfaces of a sheet base material, followed by a release treatment, or a release sheet obtained by applying a release agent on only one surface of a sheet base material, followed by a release treatment.

Examples of the sheet base material which is used in the release sheet include paper base materials such as glassine paper, coated paper, cast-coated paper, etc.; laminate papers obtained by laminating a thermoplastic resin such as polyethylene, etc. on such a paper base material; plastic films such as a polyester film (polyethylene terephthalate, polybutylene terephthalate, polyethylene naphthalate, etc.), and a polyolefin film (polypropylene, polyethylene, etc.); and the like.

Examples of the release agent include rubber based elastomers such as an olefin based resin, an isoprene based resin, a butadiene based resin, etc., long-chain alkyl based resins, alkyd based resins, fluorine based resins, silicone based resins, and the like.

Though a thickness of the release sheet is not particularly limited, it is usually from 20 to 200 μm, and preferably from 25 to 150 μm.

Though a thickness of the layer made of a release agent in the release sheet after drying is not particularly limited, in the case of applying the release agent in a solution state, the thickness is preferably from 0.01 to 2.0 μm, and more preferably from 0.03 to 1.0 μm. In the case of using a plastic film as the sheet base material of the release sheet, a thickness of the plastic film is preferably from 3 to 50 μm, and more preferably from 5 to 40 μm.

[Production Method of Flame Retardant Adhesive Sheet]

A production method of the flame retardant adhesive sheet of the present invention is not particularly limited. For example, so long as the flame retardant adhesive sheet 1a shown in FIG. 1(a) is concerned, it can be fabricated by applying an adhesive agent on one surface of the base material 11, followed by drying to form the adhesive agent layer 12a.

In addition, so long as the flame retardant adhesive sheet 1b shown in FIG. 1 (b) is concerned, an adhesive agent is applied on the surface of the release sheet 13a and dried to form the adhesive agent layer 12a, and thereafter, the base material 11 is stuck onto the adhesive agent layer 12a, thereby fabricating a single-sided adhesive sheet.

So long as the double-sided flame retardant adhesive sheet 1c shown in FIG. 1 (c) is concerned, it can be fabricated by applying an adhesive agent on one surface of the base material 11 and drying to form the adhesive agent layer 12a, and thereafter, similarly applying an adhesive agent on the other surface of the base material 11, followed by drying to form the adhesive agent layer 12b.

On the occasion of applying the adhesive agent which is used in the present invention, for the purpose of facilitating the formation of an adhesive agent layer having a thin thickness on the base material, it is preferable to dilute the adhesive agent with an organic solvent.

Examples of the organic solvent which is used include toluene, ethyl acetate, methyl ethyl ketone, and the like. By blending such an organic solvent to form an adhesive agent solution having an adequate solid content concentration, the adhesive agent layer which has been reduced in thickness can be formed. The solid content concentration of the adhesive agent is preferably from 5 to 60% by mass, and more preferably from 10 to 40% by mass. When the solid content concentration of the adhesive agent is 5% by mass or more, the use amount of the solvent is sufficient, whereas when it is not more than 60% by mass, the adhesive agent solution has an adequate viscosity, so that on the occasion of applying the adhesive agent solution, the workability becomes satisfactory.

Incidentally, in the case where the above-described acrylic copolymer (A) and/or urethane resin (B) which is used in the above-described adhesive agent is used in a state of being contained in the organic solvent, the adhesive agent solution may also be prepared upon dilution with the same organic solvent so as to have the above-described solid content concentration.

A method for forming the adhesive agent layer on the base material or on the release sheet is not particularly limited, and examples thereof include a method for forming an adhesive agent (solution) having the above-described organic solvent blended therein by a known application method.

Examples of the application method include known methods such as a spin coating method, a spray coating method, a bar coating method, a knife coating method, a roll coating method, a blade coating method, a die coating method, a gravure coating method, etc.

In addition, for the purpose of not only preventing retention of the solvent or low-boiling component from occurring, but in the case where the crosslinking agent is blended, advancing the crosslinking (reaction) to reveal adhesive properties, after application on the base material or release sheet, it is preferable to conduct a heat treatment.

A temperature condition of the heat treatment is preferably from 70 to 150° C., and more preferably from 80 to 120° C. A treatment time of the heat treatment is preferably from 30 seconds to 5 minutes, and more preferably from 40 to 180 seconds.

[Physical Properties of Flame Retardant Adhesive Sheet]

The adhesive strength of the thus fabricated flame retardant adhesive sheet of the present invention at ordinary temperature (23° C. and 50% RH (relative humidity)) is 3.0 N/25 mm or more in the measurement method described in the Examples.

In addition, the above-described flame retardant adhesive sheet has flame retardant properties adapted to VTM-0 in a test according to the UL94 standard. Specifically, the flame retardant properties can be measured by the method described in the Examples.

EXAMPLES

The weight average molecular weight (Mw) shown in the description of the following Examples is a value obtained by conducting the measurement using "HLC-8020", manufactured by Tosoh Corporation under the following condition and reducing into standard polystyrene.

(Measurement Condition)

Column: "TSK gel GMHXL (×2)" and "TSK gel G2000HXL" (all of which are manufactured by Tosoh Corporation)

Column temperature: 40° C.

Developing solvent: Tetrahydrofuran

Flow rate: 1.0 mL/min

Detector: Differential refractometer

Production Example 1

Preparation of Acrylic Copolymer Solution 90 parts by mass of butyl acrylate and 10 parts by mass of acrylic acid as monomer components, 200 parts by mass of ethyl acetate as a solvent, and 0.2 parts by mass of azobisisobutyronitrile as a polymerization initiator were charged in a reactor and mixed. Deaeration with a nitrogen gas was conducted for 4 hours, the temperature was gradually increased to 60° C., and a polymerization reaction was then conducted with stirring for 24 hours, thereby obtaining an ethyl acetate solution containing an acrylic copolymer having a weight average molecular weight of 650,000 (solid content concentration: 33% by mass).

Production Example 2

Preparation of Urethane Resin Solution (B-1)

100 parts by mass of polypropylene glycol (weight average molecular weight: 2,000) as the polyol (b1), 10.1 parts by mass of hexamethylene diisocyanate (NCO group/OH group (molar ratio)=1.2) as the polyvalent isocyanate compound (b2), and 0.01 parts by mass of dibutyltin dilaurate as a catalyst were mixed, the temperature was gradually increased to 85° C., and the resultant was then stirred for 2 hours, thereby obtaining an isocyanate-terminated urethane prepolymer.

110 parts by mass of toluene was added to the obtained isocyanate-terminated urethane prepolymer, and the mixture was gradually cooled to room temperature. Thereafter, 0.60 parts by mass of 1,4-butanediol (b4) was dropped as the chain extender (b3), the temperature was gradually increased to 70° C., and the resultant was stirred for 2 hours, thereby obtaining a toluene solution of a urethane resin having a weight average molecular weight of 170,000 (B-1; solid content concentration: 50% by mass). The composition and the like are shown in Table 1.

Production Example 3

Preparation of Urethane Resin Solution (B-2)

A toluene solution of a urethane resin having a weight average molecular weight of 140,000 (B-2; solid content concentration: 50% by mass) was obtained in the same manner as that in Production Example 2, except that in Production Example 1, as for the chain extender (b3), the amount of the used 1,4-butanediol (b4) was changed to 0.48 parts by mass, and 0.12 parts by mass of trimethylolpropane (b5) was further added. The composition and the like are shown in Table 1.

TABLE 1

| | Isocyanate-terminated urethane prepolymer | | (b3) Chain extender | | | Weight |
|---|---|---|---|---|---|---|
| | (b1) Polypropylene glycol Parts by mass | (b2) Hexamethylene diisocyanate Parts by mass | (b4) 1,4-Butanediol Parts by mass | (b5) Trimethylolpropane Parts by mass | (b4)/(b5) Mass ratio | average molecular weight — |
| Production Example 2 (B-1) | 100 | 10.1 | 0.60 | — | 100/0 | 170,000 |
| Production Example 3 (B-2) | 100 | 10.1 | 0.48 | 0.12 | 80/20 | 140,000 |

Example 1

Fabrication of Flame Retardant Adhesive Sheet

A mixture of 25 parts by mass (solid content) of the ethyl acetate solution containing an acrylic copolymer obtained in Production Example 1, 100 parts by mass (solid content) of the toluene solution containing a urethane resin (B-1) obtained in Production Example 2, and 2.25 parts by mass (solid content) of an isocyanate based crosslinking agent (a trade name: "CORONATE L", manufactured by Nippon Polyurethane Industry Co., Ltd.; an ethyl acetate solution of trimethylolpropane-modified tolylene diisocyanate (solid content: 75% by mass)) as a crosslinking agent was diluted with ethyl acetate such that the solid content concentration was 10% by mass, thereby preparing an adhesive agent solution.

This solution was applied onto a silicone-treated 38 μm-thick polyester film (a trade name: "SP-PET381031", manufactured by Lintec Corporation) that is a release sheet, such that a thickness of the adhesive agent layer after drying was 1.0 μm, followed by drying at 100° C. for 1 minute. Thereafter, the resultant was transferred onto a polyethylene terephthalate (PET) film in which a polyimide resin was coated on both surfaces thereof (a trade name: "LUMIRROR ZV10#25", manufactured by Toray Industries, Inc., thickness: 30 μm, which is adapted to VTM-0 in a test according to the UL94 standard) that is a base material, thereby fabricating a flame retardant adhesive sheet.

Incidentally, the thickness of each of the layers of the flame retardant adhesive sheet and the total thickness thereof were measured by observing a cross section of the sheet by an electron microscope (a trade name: "VHX-1000", manufactured by Keyence Corporation).

(Evaluation of Flame Retardant Properties)

The release sheet of the thus fabricated flame retardant adhesive sheet was peeled off, and a test according to the thin material vertical burning test method of the flame retardant test standard of plastic materials UL 94, published by Underwriters Laboratories Inc. was conducted, thereby deciding the VTM rank. The flame retardant adhesive sheet used for the evaluation had a sample size of 50 mm×200 mm, and the test was conducted while making the adhesive agent layer outside.

Incidentally, the decision criteria of the VTM rank are as follows.

VTM-0: A burning time of the sample is within 10 seconds, ignition of absorbent cotton due to a burnt material or dropped material does not occur, and furthermore, burning to a marked line (position of 125 mm from a lower end of the sample) is not perceived.

VTM-1: A burning time of the sample is within 30 seconds, ignition of absorbent cotton due to a burnt material or dropped material does not occur, and furthermore, burning to a marked line is not perceived.

VTM-2: A burning time of the sample is within 30 seconds, and burning to a marked line is not perceived.

The evaluation results are shown in Table 2. Incidentally, in Table 2, a sample which was adapted to VTM-0 is designated as "VTM-0"; a sample which was not adapted to VTM-0 but adapted to VTM-1 is designated as "VTM-1"; a sample which was not adapted to VTM-0 or VTM-1 but adapted to VTM-2 is designated as "VTM-2"; and a sample which was not adapted to any of VTM-0, VTM-1, and VTM-2 is designated as "failed".

(Adhesive Strength Test)

An adhesive sheet for adhesive strength test was fabricated in the same manner as that described above, except for using a 25 μm-thick polyester film (a trade name: "T-100", manufactured by Mitsubishi Plastics, Inc.) as the base material in place of the "LUMIRROR ZV10#25".

A test piece of the above-described adhesive sheet obtained by peeling off the release sheet and cutting the resulting sheet into a size of 25 mm×300 mm in an environment at 23° C. and 50 RH % was stuck onto an adherend (SUS304 steel plate), thereby preparing a sample of adhesive strength test. 24 hours after sticking, the adhesive strength was measured at a peeling rate of 300 mm/min by a 180° peel-off method on the basis of JIS 20237. The evaluation results are shown in Table 2.

Examples 2 to 15 and Comparative Examples 1 to 14

Adhesive sheets were fabricated in the same method as that in Example 1, except for changing the base material and the adhesive agent layer to those described in Table 2. In addition, the evaluation of flame retardant properties and the adhesive strength test were conducted in the same methods as those in Example 1. The evaluation results are shown in Table 2.

TABLE 2

| | Base material | | (A) Acrylic copolymer | (B) Urethane resin | | (C) Crosslinking agent | | Flame retardant agent (melamine cyanurate) | Thickness per surface (μm) | Total Thickness (μm) | Evaluation results | |
|---|---|---|---|---|---|---|---|---|---|---|---|---|
| | Type | Thickness (μm) | Parts by mass | Type | Parts by mass | Type | Parts by mass | Parts by mass | | | Adhesive strength (N/25 mm) | Flame retardant properties UL94 |
| Example 1 | LUMIRROR ZV10#25 | 30 | 10 | B-1 | 90 | CORONATE L | 2.25 | — | 1.0 | 1.0 | 5.4 | VTM-0 |
| Example 2 | LUMIRROR ZV10#25 | 30 | 10 | B-1 | 90 | CORONATE L | 2.25 | — | 2.0 | 2.0 | 7.1 | VTM-0 |
| Example 3 | LUMIRROR ZV10#25 | 30 | 20 | B-1 | 80 | CORONATE L | 2.25 | — | 1.0 | 1.0 | 3.4 | VTM-0 |
| Example 4 | LUMIRROR ZV10#25 | 30 | 20 | B-1 | 80 | CORONATE L | 2.25 | — | 2.0 | 2.0 | 4.4 | VTM-0 |
| Example 5 | LUMIRROR ZV10#25 | 30 | 10 | B-2 | 90 | CORONATE L | 2.25 | — | 1.0 | 1.0 | 6.0 | VTM-0 |
| Example 6 | LUMIRROR ZV10#25 | 30 | 10 | B-2 | 90 | CORONATE L | 2.25 | — | 2.0 | 2.0 | 7.4 | VTM-0 |
| Example 7 | LUMIRROR ZV10#25 | 30 | 20 | B-2 | 80 | CORONATE L | 2.25 | — | 1.0 | 1.0 | 7.7 | VTM-0 |
| Example 8 | LUMIRROR ZV10#25 | 30 | 20 | B-2 | 80 | CORONATE L | 2.25 | — | 2.0 | 2.0 | 8.3 | VTM-0 |
| Example 9 | LUMIRROR ZV10#40 | 45 | 20 | B-2 | 80 | CORONATE L | 2.25 | — | 1.6 | 1.6 | 8.0 | VTM-0 |
| Example 10 | LUMIRROR ZV10#40 | 45 | 20 | B-2 | 80 | CORONATE L | 2.25 | — | 1.8 | 1.8 | 8.2 | VTM-0 |
| Example 11 | LUMIRROR ZV10#40 | 45 | 20 | B-2 | 80 | CORONATE L | 2.25 | — | 2.0 | 2.0 | 8.3 | VTM-0 |
| Example 12 | KAPTON 100H | 25 | 20 | B-2 | 80 | CORONATE L | 2.25 | — | 1.6 | 1.6 | 8.0 | VTM-0 |
| Example 13 | KAPTON 100H | 25 | 20 | B-2 | 80 | CORONATE L | 2.25 | — | 1.8 | 1.8 | 8.2 | VTM-0 |
| Example 14 | KAPTON 100H | 25 | 20 | B-2 | 80 | CORONATE L | 2.25 | — | 2.0 | 2.0 | 8.3 | VTM-0 |
| Example 15 | LUMIRROR ZV10#25 | 25 | 20 | B-2 | 80 | CORONATE L | 2.25 | — | 0.7 | 0.7 | 3.5 | VTM-0 |
| Comparative Example 1 | LUMIRROR ZV10#25 | 30 | 10 | B-1 | 90 | CORONATE L | 2.25 | — | 3.0 | 3.0 | 8.5 | Failed |
| Comparative Example 2 | LUMIRROR ZV10#25 | 30 | 20 | B-1 | 80 | CORONATE L | 2.25 | — | 3.0 | 3.0 | 6.7 | Failed |
| Comparative Example 3 | LUMIRROR ZV10#25 | 30 | 10 | B-2 | 90 | CORONATE L | 2.25 | — | 3.0 | 3.0 | 8.2 | Failed |
| Comparative Example 4 | LUMIRROR ZV10#25 | 30 | 20 | B-2 | 80 | CORONATE L | 2.25 | — | 3.0 | 3.0 | 8.8 | Failed |
| Comparative Example 5 | LUMIRROR ZV10#25 | 30 | — | B-1 | 100 | CORONATE L | 2.25 | — | 1.0 | 1.0 | 0.8 | VTM-0 |
| Comparative Example 6 | LUMIRROR ZV10#25 | 30 | — | B-2 | 100 | CORONATE L | 2.25 | — | 3.0 | 3.0 | 3.4 | Failed |
| Comparative Example 7 | LUMIRROR ZV10#25 | 30 | 100 | — | 0 | CORONATE L | 2.25 | — | 1.0 | 1.0 | 0.5 | VTM-0 |
| Comparative Example 8 | LUMIRROR ZV10#25 | 30 | 100 | — | 0 | CORONATE L | 2.25 | — | 3.0 | 3.0 | 3.6 | Failed |
| Comparative Example 9 | LUMIRROR ZV10#40 | 45 | 20 | B-2 | 80 | CORONATE L | 2.25 | — | 2.4 | 2.4 | 8.5 | Failed |
| Comparative Example 10 | LUMIRROR ZV10#40 | 45 | 20 | B-2 | 80 | CORONATE L | 2.25 | — | 2.6 | 2.6 | 8.7 | Failed |
| Comparative Example 11 | KAPTON 100H | 25 | 20 | B-2 | 80 | CORONATE L | 2.25 | — | 2.4 | 2.4 | 8.5 | Failed |
| Comparative Example 12 | KAPTON 100H | 25 | 20 | B-2 | 80 | CORONATE L | 2.25 | — | 2.6 | 2.6 | 8.7 | Failed |
| Comparative Example 13 | LUMIRROR ZV10#25 | 30 | 20 | B-2 | 80 | CORONATE L | 2.25 | 30 | 1.6 | 1.6 | 1.7 | VTM-0 |
| Comparative Example 14 | LUMIRROR ZV10#25 | 30 | 20 | B-2 | 80 | CORONATE L | 2.25 | — | 0.5 | 0.5 | 1.3 | VTM-0 |

*1: LUMIRROR ZV10#25: A PET film, manufactured by Toray Industries, Inc., in which a polyimide resin is coated on both surfaces thereof and which is adapted to VTM-0.
*2: LUMIRROR ZV10#40: A PET film, manufactured by Toray Industries, Inc., in which a polyimide resin is coated on both surfaces thereof and which is adapted to VTM-0.
*3: KAPTON 100H: A polyimide resin film, manufactured by Du Pont-Toray Co., Ltd., which is adapted to VTM-0.
*4: CORONATE L: An ethyl acetate solution of trimethylolpropane-modified tolylene diisocyanate, which is manufactured by Nippon Polyurethane Industry Co., Ltd.

From Table 2, the adhesive sheets obtained in Examples 1 to 15 of the present invention have excellent flame retardant properties and adhesive strength.

On the other hand, the adhesive sheets obtained in Comparative Examples 5 and 7 were insufficient in the adhesive strength because the adhesive agent constituting the adhesive agent layer did not contain the component (A) or the component (B). In addition, in the adhesive sheets obtained in Comparative Examples 1 to 4, 6, and 8 to 12, the sufficient flame retardant properties were not obtained because the total thickness of the adhesive agent layer exceeded 2.2 μm.

The adhesive sheet obtained in Comparative Example 13 was insufficient in the adhesive strength because the adhesive agent constituting the adhesive agent layer contained melamine cyanurate that is the flame retardant agent; and the adhesive sheet obtained in Comparative Example 14 was insufficient in the adhesive strength because the thickness per surface of the adhesive agent layer was less than 0.6 μm.

INDUSTRIAL APPLICABILITY

In the flame retardant adhesive sheet of the present invention, by using a specified adhesive agent, the adhesive agent layer can be reduced in thickness while having sufficient adhesive properties, and therefore, even when the adhesive agent constituting the adhesive agent layer does not contain a flame retardant agent, a sheet having both excellent flame retardant properties and adhesive properties can be provided. The flame retardant adhesive sheet is suitably used in small-sized electronic appliances such as portable electronic appliances, etc.

REFERENCE SIGNS LIST 1a, 1b, 1c: Flame retardant adhesive sheet
11: Base material
12a, 12b: Adhesive agent layer
13a: Release sheet

The invention claimed is:

1. A flame retardant adhesive sheet comprising an adhesive agent layer on at least one surface of a base material, wherein
the base material has flame retardant properties adapted to VTM-0 in a test according to the UL94 standard;
a thickness of the adhesive agent layer disposed on at least one surface of the base material is 0.6 μm or more, and a total thickness of the adhesive agent layer is not more than 2.2 μm;
the adhesive agent constituting the adhesive agent layer does not comprise a flame retardant agent but comprises (A) an acrylic copolymer and (B) a urethane resin; and
the urethane resin (B) is a urethane resin which is obtained by allowing an isocyanate-terminated urethane prepolymer obtained by a reaction between (b1) a polyol and (b2) a polyvalent isocyanate compound to react with (b3) a chain extender, the chain extender (b3) comprising (b4) a compound having two hydroxyl groups and/or amino groups and (b5) a compound having three or more hydroxyl groups and/or amino groups, and the component (b4) and the component (b5) being allowed to react with each other in a proportion of from 70/30 to 100/0 in terms of a mass ratio.

2. The flame retardant adhesive sheet according to claim 1, wherein the base material is a base material which comprises neither a halogen based flame retardant agent nor a phosphorus based flame retardant agent.

3. The flame retardant adhesive sheet according to claim 1, wherein the base material is a base material which does not comprise a flame retardant agent.

4. The flame retardant adhesive sheet according to claim 1, wherein the base material is a base material comprising a polyimide resin, a polyaramid resin, a polyphenylene sulfide resin, or a polyetheretherketone resin, or a base material coated with such a resin.

5. The flame retardant adhesive sheet according to claim 1, wherein the polyol (b1) is a glycol having a weight average molecular weight of from 1,000 to 3,000.

6. The flame retardant adhesive sheet according to claim 1, wherein the adhesive agent constituting the adhesive agent layer further comprises (C) a crosslinking agent, and the acrylic copolymer (A) has a crosslinking functional group capable of reacting with the crosslinking agent (C).

7. The flame retardant adhesive sheet according to claim 6, wherein the crosslinking functional group is a carboxy group, a hydroxyl group, or both.

8. The flame retardant adhesive sheet according to claim 6, wherein the crosslinking agent (C) is an isocyanate based crosslinking agent.

9. The flame retardant adhesive sheet according to claim 1, wherein a mass ratio of the acrylic copolymer (A) to the urethane resin (B) is from 1/99 to 40/60.

10. The flame retardant adhesive sheet according to claim 1, wherein a weight average molecular weight (Mw) of the acrylic copolymer (A) is from 300,000 to 1,500,000.

11. The flame retardant adhesive sheet according to claim 1, wherein the polyvalent isocyanate compound comprises at least one member selected from the group consisting of aromatic polyisocyanates, aliphatic polyisocyanates and alicyclic polyisocyanates.

12. The flame retardant adhesive sheet according to claim 1, wherein the polyvalent isocyanate compound comprises at least one member selected from the group consisting of 4,4'-diphenylmethane diisocyanate, 2,4-tolylene diisocyanate, 2,6-tolylene diisocyanate, hexamethylene diisocyanate, 3-isocyanatomethyl-3,5,5-trimethylcyclohexyl isocyanate, and modified products thereof.

13. The flame retardant adhesive sheet according to claim 1, wherein the acrylic copolymer comprises polymerized units of a (meth)acrylic acid ester.

14. The flame retardant adhesive sheet according to claim 1, wherein the component (b5) is a polyol having three or more hydroxyl groups.

15. The flame retardant adhesive sheet according to claim 1, wherein the polyol is one or more compounds selected from the group consisting of trimethylolpropane, ditrimethylolpropane, pentaerythritol and dipentaerythritol.

* * * * *